_United States Patent Office_

3,574,768
Patented Apr. 13, 1971

3,574,768
SYNTHESIS OF BETA-MERCAPTOETHANOL
Harold W. Tompkins, Phillips, Tex., assignor to Phillips
Petroleum Company
No Drawing. Filed Oct. 28, 1968, Ser. No. 771,288
Int. Cl. C07c *149/18*
U.S. Cl. 260—609                                     7 Claims

ABSTRACT OF THE DISCLOSURE

Ethylene oxide and hydrogen sulfide are reacted in liquid phase to produce monothioglycol $HSCH_2CH_2OH$ (2-mercaptoethanol). Liquid phase retention of product catalyzes the reaction. The liquid phase with a large excess of $H_2S$ permits good temperature control. Sufficient large excess of the $H_2S$ over the ethylene oxide is used to control the temperature of the exothermic reaction by vaporizing the liquid excess $H_2S$. High yields of high purity product of the order of substantially in the range of 90 plus percent, e.g., 95 plus percent, is realized. The molecular ratio of $H_2S$ to the oxide is broadly 5–15, and more preferably in the range 7–13. Low temperatures of the order of about 125–300° F., preferably of the order of about 130–260° F. are possible to be employed under conditions of operation. Preferably, a catalyst such as an activated alumina catalyst is used. Purities of 99.2 weight percent have been obtained.

SYNTHESIS OF BETA-MERCAPTOETHANOL

This invention relates to the synthesis of beta-mercaptoethanol. In one of its aspects it relates to the conversion of ethylene oxide to beta-mercaptoethanol. In another of its aspects it relates to the production of beta-mercaptoethanol employing an activated alumina catalyst. In a further aspect of the invention it relates to a method for reacting ethylene oxide with hydrogen sulfide.

According to one of its concepts the invention provides a process for the synthesis of beta-mercaptoethanol by reacting ethylene oxide and hydrogen sulfide in liquid phase, there being sufficient excess of $H_2S$ over the ethylene oxide to maintain the liquid phase at a reasonable pressure in quantities sufficient to permit adequate temperature control. In another of its concepts the invention provides such a process in which the ethylene oxide and hydrogen sulfide are reacted as described in the presence of an activated alumina catalyst.

It is known in the art, see French Patent 769,216, published Aug. 22, 1934, to maintain a slight excess of humid hydrogen sulfide over ethylene oxide in a reaction in the presence of kaolin heated to 150–160° C. to obtain 60 percent of the theoretical yield of thiomonoethylene glycol, based on ethylene oxide.

I have now discovered that by the use of rather large excesses, namely, mole ratios of the order of at least about 7 of $H_2S$ to 1 of ethylene oxide, that yields of about 85 percent and substantially higher, say, 90 percent, of beta-mercaptoethanol can be obtained at reasonably low temperatures of the order of about, say, 135–250° F., or so, as distinguished from the 150–160° C. (302–320° F.) of the French patent.

It is an object of this invention to produce beta-mercaptoethanol. It is another object of this invention to convert ethylene oxide to beta-mercaptoethanol. A further object of this invention is to provide a relatively low temperature, low pressure process for the conversion of ethylene oxide to beta-mercaptoethanol by reacting the oxide with hydrogen sulfide under conditions to which the invention is directed.

Other aspects, concepts and objects of this invention are apparent from a study of this disclosure and the appended claims.

According to the present invention ethylene oxide and hydrogen sulfide are reacted in liquid phase at a temperature in the approximate range of from about 125 to about 300° F. in the presence of a catalyst and, still according to the invention, employing a large excess of hydrogen sulfide over the ethylene oxide, this excess being in the range of from about 5 to 15, more preferably 7 to 13 or more moles of hydrogen sulfide to ethylene oxide.

Still according to the invention, the catalyst which can be employed is an activated alumina. Feed rates between 12 and 18 volumes per volume of the activated alumina catalyst (ALCOA H–151 alumina) per hour have given good results.

In view of the large excess of hydrogen sulfide which is employed and the reaction which can be obtained at low temperatures at reasonably low pressures, the operation is a liquid phase operation which can be arranged to keep the catalyst clean by washing the same with the liquid being contacted therewith.

According to the operation of the invention, it is possible to produce upwards of 99 weight percent purity, 2-mercaptoethanol. Further, the process of this invention produces a very small amount of thiodiglycol, as can be seen from the tabular data below.

Although a specific activated alumina catalyst has been referred to, it follows that other equivalent catalysts which function to produce the desired results can be employed. Floridin bauxite has been employed.

Generally, the procedure followed in the runs was to preheat the catalyst case and product accumulator to the desired temperatures while feeding hydrogen sulfide to the unit, whereupon ethylene oxide pumping was started and the rate adjusted to give desired mole ratio. Once ethylene oxide was flowing and reacting with the hydrogen sulfide, no additional external heat was usually required. The heat of reaction was sufficient to keep the temperature in the operating range. A pressure controller at the top of the accumulator was set at 500 pounds per square inch gauge and this pressure was maintained on the system in the runs. Product was withdrawn from the bottom of the accumulator at ½ or hourly intervals and was analyzed for mercaptan sulfur and for composition by chromatograph.

It was discovered, and it is set forth as a feature of this invention, that liquid product trapped in the catalyst case will catalyze the reaction as is evident by a sharp drop in temperature and appearance of considerable ethylene oxide in the exiting $H_2S$ whenever liquid trapped product is removed from the catalyst case.

The catalyst case employed was ¾ inch by 40 inches long stainless steel pipe. Catalyst case having a ½ inch diameter by 40 inches long was also used.

Both Pure Grade $H_2S$ and Plant Grade $H_2S$ of composition given below have been used to obtain results according to the invention.

The composition of the Plant Grade hydrogen sulfide is now given.

TABLE I.—COMPOSITION [1] OF HYDROGEN SULFIDE USED IN SYTHESIS OF 2-MERCAPTOETHANOL

| | Plant Grade, cylinder | |
|---|---|---|
| Component | Number 1 | Number 2 |
| Carbon dioxide | 0.56 | 0.00 |
| Hydrogen sulfide | 97.39 | 92.93 |
| Carbonyl sulfide | 0.25 | 2.53 |
| Carbon disulfide | 0.43 | 0.56 |
| $C_{12}$ Olefins | 0.04 | 0.00 |
| Methane | 0.00 | 0.00 |
| Ethane | 0.06 | 0.00 |
| Propylene | 0.00 | 0.01 |
| Propane | 0.70 | 0.50 |
| Isobutane | 0.20 | 0.33 |
| Butene-1 | 0.12 | 1.51 |
| tert-Butyl mercaptan | 0.00 | 0.00 |
| Methanol | 0.03 | 0.04 |
| sec-Butyl mercaptan | 0.11 | 1.21 |
| Isobutyl mercaptan | 0.11 | 0.32 |
| Normal butyl mercaptan | 0.00 | 0.00 |
| Totals | 100.00 | 100.00 |

[1] By mass spectrometer, in mole percent.

NOTE.—The Pure Grade $H_2S$ used was 99 percent minimum.

In the following tables are given data from which the nature of the concepts basic to this invention are evident. Table II shows data for the reaction of ethylene oxide with hydrogen sulfide with no catalyst other than the reaction product, 2-mercaptoethanol, in the catalyst case. The catalyst case was inclined so that the outlet end was ½ inch higher than the inlet. This trapped a small amount of the reaction product in the catalyst case—a ¾ inch pipe 40 inches long. Twice during the reaction runs the tube was raised to a level position so that the trapped liquid drained into the product accumulator. Both times the reaction stopped almost immediately, as was indicated by a sharp drop in temperature and appearance of considerable ethylene oxide in the effluent from the catalyst case.

The feed when an activated alumina catalyst such as that employed in the examples is used, will generally be in the range of from about 12 to about 25 volumes per volume of catalyst per hour.

Reasonable variation and modifications are possible within the scope of the foregoing disclosure and the appended claims to the invention the essence of which is that ethylene oxide and hydrogen sulfide are reacted in liquid phase employing a large excess of $H_2S$ and in one embodiment of the invention a catalyst to produce high purity, high yields of 2-mercaptoethanol.

I claim:
1. A process for the production of beta-mercaptoethanol which comprises in presence of a catalyst reacting ethylene oxide and $H_2S$ at an elevated temperature in the range of from about 135 to about 260° F. and an elevated pressure employing a large excess of $H_2S$ such that at said temperature and pressure liquid phase is present.
2. A process according to claim 1 wherein the $H_2S$/ethylene oxide mol ratio is in excess of about 5.
3. A process according to claim 1 wherein an activated alumina catalyst is employed.
4. A process according to claim 1 wherein the mol ratio of $H_2S$/ethylene oxide is in excess of about 7.
5. A process according to claim 4 wherein the temperature is in the range of from about 125 to about 300° F., the ratio is in the range of from about 7 to about 13 and the pressure is in the order of about 400 to about 1,000 p.s.i.
6. A process accoring to claim 4 wherein an activated alumina catalyst is employed.
7. A process for the production of beta-mercaptoethanol according to claim 1 wherein the ratio of $H_2S$ to ethylene oxide is in the approximate range of from about 5 to about 15, the temperature is in the approximate range of 130 to

TABLE II

| | Mole ratio, $H_2S$/oxide | Vol./vol./hour | | Crude composition | | | Yield,[1] mole percent | | Mole [2] percent oxide in off-gas |
|---|---|---|---|---|---|---|---|---|---|
| | | Feed | Product | 1,2-ethane-dithiol | Mercapto-ethanol | Thiodi-glycol plus heavies | Mercapto-ethanol | Conversion of oxide | |
| Temperature, ° F.: | | | | | | | | | |
| 238 | 4.3 | 2.9 | 0.5 | 0.1 | 84.2 | 15.7 | 53.7 | 66.5 | 10.3 |
| 254 | 4.5 | 4.2 | 0.8 | 0.1 | 83.0 | 16.9 | 62.5 | 78.7 | 5.5 |
| 300 | 5.3 | 6.8 | 1.4 | 0.1 | 80.7 | 19.2 | 65.8 | 86.0 | 3.1 |

[1] Based on ethylene oxide.
[2] Calculated from material balance data.

TABLE III

| | Mole ratio, $H_2S$/oxide | Vol./vol./hour | | Crude composition | | | Yield, mole percent | | Mole Per cent oxide in off-gas [4] |
|---|---|---|---|---|---|---|---|---|---|
| | | Feed | Product | EDT [1] | BME [2] | TDG [3] | Mercapto-ethanol | Conversion of oxide | |
| Temperature, ° F.: | | | | | | | | | |
| 135 | 10.7 | 24.4 | 2.9 | 0.2 | 95.4 | 3.7 | 84.0 | 89.7 | 1.1 |
| 200 | 12.9 | 18.2 | 2.0 | 2.7 | 94.8 | 1.7 | 90.3 | 94.3 | 0.5 |
| 257 | 7.2 | 12.5 | 2.4 | 6.0 | 85.7 | 7.5 | 84.3 | 97.9 | 0.3 |

[1] 1,2-ethanedithiol and lights.
[2] 2-mercaptoethanol.
[3] Thiodiglycol and heavies.
[4] Average values calculated from material balance.

As can be seen in Table III, the now preferred ratios are in excess of about 7 and can be as high as about 13 using activated alumina catalyst.

The pressure can be varied such that the excess hydrogen sulfide will be present as a liquid. One skilled in the art in possession of this disclosure having studied the same can determine the pressure by mere routine test. Generally, the pressure will be in the approximate range of from about 400 to about 1,000 pounds per square inch. As can be seen from the data, at 500 pounds per square inch, good results have been obtained and by varying the mole ratio of the $H_2S$ to the ethylene oxide, excellent results have been discovered.

The temperature now preferred, as can be seen from the obtained data will be in the approximate range of from about 130 to about 250 or 260° F.

about 260° F., the feed in volumes per volume of catalyst per hour is in the approximate range of from about 12 to about 25, and the catalyst is an activated alumina.

References Cited

FOREIGN PATENTS

| 769,216 | 1934 | France | 260—609 |
| 1,359,678 | 1964 | France | 260—609 |

OTHER REFERENCES

Yur'ev et al.: "Chem. Abstracts," vol. 43 (1949), 2624.

CHARLES B. PARKER, Primary Examiner

D. R. PHILLIPS, Assistant Examiner